(12) United States Patent
Bergheaud et al.

(10) Patent No.: US 8,984,513 B2
(45) Date of Patent: Mar. 17, 2015

(54) TRANSFER OF EVENT LOGS FOR REPLICATION OF EXECUTING PROGRAMS

(75) Inventors: Philippe Bergheaud, Colmar (FR); Dinesh K. Subhraveti, Milpitas, CA (US); Marc P. Vertes, Saint-Lys (FR)

(73) Assignee: International Business Machines Corporation, Armonk, NY (US)

( * ) Notice: Subject to any disclaimer, the term of this patent is extended or adjusted under 35 U.S.C. 154(b) by 1188 days.

(21) Appl. No.: 12/438,744

(22) PCT Filed: Mar. 30, 2007

(86) PCT No.: PCT/EP2007/053122
§ 371 (c)(1),
(2), (4) Date: Feb. 25, 2009

(87) PCT Pub. No.: WO2008/025575
PCT Pub. Date: Mar. 6, 2008

(65) Prior Publication Data
US 2009/0328044 A1 Dec. 31, 2009

(30) Foreign Application Priority Data
Aug. 28, 2006 (EP) ..................................... 06300896

(51) Int. Cl.
*G06F 9/46* (2006.01)
*G06F 11/20* (2006.01)
*G06F 9/44* (2006.01)

(52) U.S. Cl.
CPC ........ *G06F 11/2097* (2013.01); *G06F 11/2038* (2013.01); *G06F 11/2048* (2013.01)
USPC .......................................... 718/101; 719/318

(58) Field of Classification Search
None
See application file for complete search history.

(56) References Cited

U.S. PATENT DOCUMENTS

| 4,812,968 A | 3/1989 | Poole |
| 5,638,509 A * | 6/1997 | Dunphy et al. ................. 714/20 |

(Continued)

FOREIGN PATENT DOCUMENTS

| FR | 2881309 A1 | 7/2006 |
| WO | WO 2006/077260 A1 | 7/2006 |

(Continued)

OTHER PUBLICATIONS

Barga, Roger et al., "Improving Logging and Recovery Performance in Phoenix/App", Proceedings of the 20th International Conference on Data Engineering, ICDE 2004, Boston, Massachusetts, 2004, pp. 486-497.

(Continued)

*Primary Examiner* — H S Sough
*Assistant Examiner* — Umut Onat
(74) *Attorney, Agent, or Firm* — Stephen R. Tkacs; Stephen J. Walder, Jr.; Parashos T. Kalaitzis (57) ABSTRACT

A mechanism for replicating programs executing on a computer system having a first storage means is provided. The mechanism identifies the events corresponding to requests from one executing program, which may be different from the executing program to be replicated, which are non-deterministic and identifies the 'Non Abortable Events' (NAE's), which change irremediably the state of the external world that need to be reproduced in the replay of the programs. These events are immediately transferred for replay and the executing program is blocked until the transfer is acknowledged. For the other non-deterministic events, they are logged and sent to the executing program, the executing programs remaining blocked only if the log is full and/or if a timer between two NAEs expires, in this case a log transfer to the standby machine is performed to prepare replication before unblocking of the executing program.

17 Claims, 6 Drawing Sheets

(56) References Cited

U.S. PATENT DOCUMENTS

| | | | |
|---|---|---|---|
| 5,895,485 A * | 4/1999 | Loechel et al. | 711/119 |
| 5,968,185 A * | 10/1999 | Bressoud et al. | 714/10 |
| 6,077,260 A | 6/2000 | Wheelock et al. | |
| 6,832,367 B1 | 12/2004 | Choi et al. | |
| 7,290,056 B1 * | 10/2007 | McLaughlin, Jr. | 709/230 |
| 7,774,647 B2 | 8/2010 | Vertes | |
| 2002/0065948 A1 | 5/2002 | Morris et al. | |
| 2003/0101287 A1 * | 5/2003 | Novik et al. | 709/318 |
| 2004/0078618 A1 * | 4/2004 | Moser et al. | 714/3 |
| 2009/0144742 A1 | 6/2009 | Subhraveti et al. | |

FOREIGN PATENT DOCUMENTS

| | | | |
|---|---|---|---|
| WO | WO 2006/079623 A1 | 8/2006 | |
| WO | WO 2008/025575 A1 | 3/2008 | |

OTHER PUBLICATIONS

U.S. Appl. No. 12/275,926.

Notice of Allowance mailed Oct. 4, 2012 for U.S. Appl. No. 12/275,926, 6 pages.

Interview Summary mailed Aug. 14, 2012 for U.S. Appl. No. 12/438,744, 3 pages.

Bacon, David F. et al., "File System Measurements and their Application to the Design of Efficient Operation Logging Algorithms", Computer Science Division, University of California, Berkeley and IBM T.J. Watson Research Center, IEEE 1991, pp. 21-30.

Bacon, David F. et al., "Hardware-Assisted Replay of Multiprocessor Programs", University of California, Berkeley and IBM Watson Research Center, ACM, 1991, pp. 194-206.

Basile, Claudio et al., "Active Replication of Multithreaded Applications", University of Illinois at Urbana-Champaign, Center of Reliable and High-Performance Computing, 2002, pp. 1-26.

Basile, Claudio et al., "Loose Synchronization of Multithreaded Replicas", Center for Reliable and High-Performance Computing, University of Illinois at Urbana-Champaign, IEEE, 2002, pp. 250-255.

Bressoud, Thomas C., "TFT: A Software System for Application—Transparent Fault Tolerance", Stratus Computer Inc., 1998, 10 pages.

Choi, Jong-Deok et al., "A Perturbation-Free Replay Platform for Cross-Optimized Multithreaded Applications", IBM T.J. Watson Research Center, International Parallel and Distributed Processing Symposium, San Francisco, CA, Apr. 23-27, 2001, 10 pages.

Christiaens, Mark et al., "Record/Replay in the Presence of Benign Data Races", International Conference on Parallel and Distributed Processing Techniques and Applications (PDPTA), 2002, 7 pages.

Christodoulopoulou, Rosalia et al., "Dynamic Data Replication: an Approach to Providing Fault-Tolerant Shared Memory Clusters", University of Toronto, In Proceedings of the Ninth Annual Symposium on High Performance Computer Architecture, 2003, pp. 1-12.

Cornelis, Frank et al., "A Taxonomy of Execution Replay Systems", Department of Electronics and Information Systems, Ghent University, 2001, 10 pages.

Dionne, Carl et al., "A Taxonomy of Distributed Debuggers Based on Execution Replay", Universite de Montreal, Proceedings of the International Conference on Parallel and Distributed Processing Techniques and Applications (PDPTA '96), Sunnyvale, California, Aug. 9-11, 1996, 12 pages.

Goldberg, Arthur et al., "Transparent Recovery of Mach Applications", IBM T.J. Watson, 1990, pp. 1-29.

Herdieckerhoff, Martin et al., "A Distributed Execution Replay Facility for Chorus", Chorus Systemes, 1994, 10 pages.

Huang, Yennun et al., "Why Optimistic Message Logging Has Not Been Used in Telecommunications Systems", AT&T Bell Laboratories, IEEE, 1995, pp. 459-463.

Huselius, Joel, "Debugging Parallel Systems: A State of the Art Report", Department of Computer Engineering, Malardalens University, Vasteras, Sweden, MRTC Report No. 63, Sep. 2002, 63 pages.

Jimenez-Peris, Ricardo et al., "Deterministic Scheduling for Transactional Multithreaded Replicas", Technical University of Madrid, Citeseer entry, IEEE, 2000, pp. 164-173.

Johnson, David B. et al., "Recovery in Distributed Systems Using Optimistic Message Logging and Checkpointing", Department of Computer Science, Rice University, 1988, 27 pages.

McKenney, P.E. et al., "Read-Copy Update: Using Execution History to Solve Concurrency Problems", Sequent, pp. 1-28. 1998.

Mellor-Crummey, J.M. et al., "A Software Instruction Counter", Computer Science Department, University of Rochester, 1989, 9 pages.

Narayanasamy, Satish et al., "BugNet: Continuously Recording Program Execution for Deterministic Replay Debugging", Proceedings of the international Symposium on Computer Architecture (ISCA 2005), Jun. 2005, 12 pages.

Poledna, Stefan et al., "Replica Determinism and Flexible Scheduling in Hard Real-Time Dependable Systems", IEEE Transactions on Computers, vol. 49, No. 2, Feb. 2000, pp. 100-111.

Powell, D. et al., "GUARDS: A Generic Upgradable Architecture for Real-Time Dependable Systems", IEEE Transactions on Parallel and Distributed Systems, vol. 10, No. 6, Jun. 1999, pp. 580-599.

Price, Daniel B., "New Techniques for Replay Debugging", Department of Computer Science, Brown University, May 1, 1998, pp, 1-18.

Ronsse, Michiel et al., "Debugging shared memory parallel programs using record/replay", Ghent University, Future Generation Computer Systems 19 (2003), Elsevier Science B.V. 2002, pp. 679-687.

Ronsse, Michiel et al., "Execution replay and debugging", Universite de Ghent, IMAG Grenoble, 2001, arXiv:cs/0011006v1 [cs. SE] Nov. 6, 2000, pp. 1-21.

Russinovich, Mark et al., "Operating System Support for Replay of Concurrent non-Deterministic Shared Memory Applications", Department of Computer Science, University of Oregon, 1995, 5 pages.

Saito, Yasush, "Jockey: A user-space library for record-replay debugging", HP Laboratories Palo Alto, Hewlett-Packard Development Company, L.P., 2005, 12 pages.

Schneider, Fred B., "Implementing Fault-Tolerant Services Using the State Machine Approach: A Tutorial", Cornell University, ACM Computing Surveys, vol. 22, No. 4, Dec. 1990, pp. 299-319.

Slye, J. Hamilton et al., "Support for Software Interrupts in Log-Based Rollback-Recovery", IEEE Transactions on Computers, vol. 47, No. 10, Oct. 1998, pp. 1113-1123.

Sosic, Rok, "History Cache: Hardware Support for Reverse Execution", Griffith University, Queensland Australia, Appeared in Computer Architecture News, vol. 22, 5, pp. 11-18, Dec. 1994, 9 pages.

Sosic, Rok, "The Many Faces of Introspection", Department of Computer Science, The University of Utah, Jun. 1992, 203 pages.

Srinivasan, Sudarshan M. et al., "Flashback: A Lightweight Extension for Rollback and Deterministic Replay for Software Debugging", Department of Computer Science, University of Illinois, Urbana-Champaign, in Usenix 2004, 15 pages.

Strom, Robert E. et al., "Volatile Logging in n-Fault-Tolerant Distributed Systems", IBM T.J. Watson Research Center, IEEE 1988, pp. 44-49.

Thane, Henrik et al., "Replay Debugging of Real-Time Systems Using Time Machines", Proceedings of the International Parallel and Distributed Processing Symposium (IPDPS'03), Apr. 2003, 8 pages.

Vertes, Marc, "Design of the Meiosys Record and Replay Module", Apr. 12, 2005 7 pages.

Vertes, Marc et al., "Deterministic Replay in Multi-Processor Systems", Dec. 23, 2004, 12 pages.

Vertes, Marc, "Deterministic Replay in Transactional Multitask Applications", Mar. 2, 2004, 14 pages.

Vertes, Marc, "Optimizing Deterministic Replay with Exclusive Access Periods", Jul. 12, 2005, 9 pages.

* cited by examiner

TRANSFER OF EVENT LOGS FOR REPLICATION OF EXECUTING PROGRAMS

BACKGROUND

The present invention generally relates to replication of executing programs from an application or modules of an operating system; more particularly, the present invention optimizes the process of recording events and transferring them from a primary machine on which programs are executed to a standby computer system.

It may be desirable to entirely replicate on a second machine, an application or an operating system running on a primary machine. Replication may be needed for program debugging purpose. Replication may be also needed for balancing workloads of systems for system management purposes. Also, replication may be needed because of a failure of the primary machine with the second machine, the standby machine, being used in replacement of the primary machine. System management and Fault Tolerant (FT) systems using replication have a need for performance. An instant replication may even be required in these cases.

The replication is achieved by recording and replaying events that produce non deterministic results. Events producing deterministic results are not recorded, as they can be reproduced by simple re-execution of the programs on the standby machine. Applications implementing communication protocols or transactional applications, such as server applications which communicate with the outside world, receive input information candidate to event logging for replication and generate output information. The output events have no need of being logged, they are just replayed by re-executing the application in the standby machine. On the contrary, when an internal or external input event occurs, the event is first locally logged and transferred to the standby system. The data transferred may be used immediately in an active-active FT model or used for a replay later in an active-passive FT model. The transfer of logged event data recorded on the primary system to the standby system where they will be replayed, must be done safely and efficiently.

It is always desirable and necessary for replication in fault tolerant systems to improve the efficiency of the main stream record of events in logs and transfer of this log. Assuming that we are able to implement record and replay locally on the primary machine, by storing the event log on the local storage system, the next step to achieve fault-tolerance is to be able to transfer in real-time all the necessary data (recorded events) to the standby machine. The most costly step in the process of replication for fault tolerant systems is this transfer of information between the primary and the standby systems; local logging costs around a few nanoseconds on 1 Go/s memory throughput CPUs as acknowledged transfer costs around dozens of microseconds on Ethernet Gbit link.

However, the process must be done safely, this requirement being achieved if the standby system is able to recover from a failure of the primary system no matter when the failure occurs. In case of failure of the primary machine, all the data must be made available for replaying the application until the point where the failure occurred, and then, the application can resume on the standby with no interruption being visible to the external world. During the execution of the application on the primary machine, a failure may happen at any moment. In particular, a failure may impact the log transfer itself, inducing the loss of critical replay data.

Existing log transfer systems have been designed, which are fast but unsafe, by not ensuring data integrity; such fast and unsafe solutions are not acceptable for FT systems. An example of such fast and unsafe protocol is UDP or Multicast IP, as used in multimedia stream broadcast systems.

Other standard solutions are safe but slow. One example is the TimesTen Database Transaction replication protocol over TCP-IP, by Oracle, when used in synchronous mode to ensure fault tolerance. To avoid the negative impact of the loss of the last recorded event, a possible solution, so called in the rest of the document the standard solution, is to transfer any event to the standby prior to its processing by the application on the operational primary machine. The primary machine then receives non-deterministic events or results only after they have been transmitted to the standby. This standard solution implies a latency in the application which corresponds to the logging and transfer of events, followed by the transfer and reception of the acknowledgment. This standard solution imposes a lot of serialization points in the application execution, or a large amount of data to be frequently transferred. Each input is delayed before being provided to the application.

SUMMARY

In one illustrative embodiment, a method executes on a computer system for replicating program executing on the computer system having a first storage, one destination being accessible from the computer system. The method comprises responsive to a non-deterministic event, blocking an executing program request from an executing program corresponding to that event. The method further comprises determining whether the non-deterministic event corresponds to a message that is an input for the executing program to be replicated or to an output request from the executing program for sending an output message, wherein the non-deterministic event is a non-abortable event. Responsive to a non-abortable event not occurring, the method comprises logging the event in the first storage, delivering the event to the executing program to be replicated, and unblocking the executing program request. Responsive to a non-abortable event, the method comprises transferring contents of the first storage to the destination, and responsive to an acknowledgment being received from the destination, unblocking the executing program request.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

DETAILED DESCRIPTION

The replication of executing programs consists in logging information concerning the execution of the programs at one point in time in a computer system in which the programs are executed. Then, the logged information is used in one other computer system to replay the programs and recreate the programs environment at that point in time in that other computer system. This replication is done for a fault tolerant system, which is to maintain a standby machine ready for restarting at any time the execution of the programs. The replication can also be used for archival purposes or for programs. The replication applies usually to an entire application. It is noted that when an application is executed on a computer, the executing programs may be programs from the application itself or other programs such as operating system modules executing for the application.

The logged information is a series of events, the events being sent or received by the modules of the application or the modules of the operating system operating in the computer system in which the application is executing. There is no need to log deterministic events as they can be replayed by simply re-executing the application. Non-deterministic events need to be logged because they will be re-injected during the replay of the application. The object is to have a minimum impact on execution of the application during the logging of events. The figures illustrate methods for logging events and transferring them for replication in a fault tolerant system, that is when the logged events are transferred to a standby machine for immediate replay.

Figure 1:
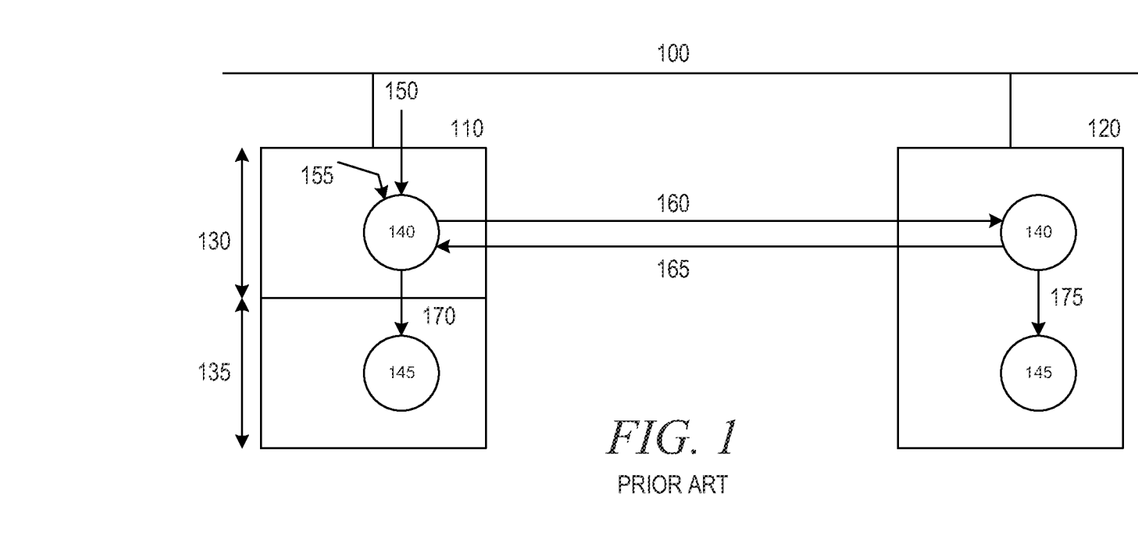
FIG. 1 illustrates a fault tolerant system implementing a standard solution for event log transfer.

FIG. 1 illustrates, with a dialog between its different system components, a FT system implementing the "safe and slow" standard solution of prior art for event log transfer. In this solution, the event log transfer is triggered by each input event, that is each non deterministic event received by the application and logged by the replication program which performs the record of the application on a primary machine and the replay of this application on a standby machine. In FIG. 1 the operational machine, the primary machine 110 executes an application 145 in the user space 135. The replication program 140 performing the application record in the primary machine operates in the kernel space 130 of the system. When an input 155 is received for the application from the external world, the network 100 or as an internal input from one other process of the kernel, it is captured by the replication program 140 implementing the standard solution. The record part of the replication program creates a log of the captured event which is not detailed here but may be performed by any efficient way to record an event for its replaying in the replay phase of the replication. The replication program sends 160 the captured input event as an event log to the replay part of the replication program 140 operating in the kernel space of a standby machine 120. Then, the replay part of the replication program in the standby machine acknowledges 165 the good reception of the event log transmission. Upon reception of the acknowledgment, the record part of the replication program in the primary machine can forward 170 the event to the application 145. In parallel, as this illustrates a fault tolerant system, the replay part of the replication program operating in the standby machine forwards 175 the event to the application 145 operating in the standby machine 120 in order to maintain it updated in case of failure. As noted above, the application executing on the primary machine receives the input event after a latency comprising the delay for capturing the input, logging it, forwarding the event and for receiving the acknowledgment of good reception by the standby machine. Even if this standard solution can be used for any situation where replication of an application is required, in the case of a fault tolerant system, the two applications must be maintained in phase in real time, which means that a high speed communication is desired between the primary and the standby machine for transmissions 160, 165. This may imply the use of different physical links from the standard network 100, such as optical fiber connections (not shown).

The problem of that standard solution resides in the latency of the log transfer and acknowledgment protocol, now imposed at each and every event occurrence, would it be from external or internal source. Even with high speed interconnect networks, this latency would be in the range of several microseconds (at best), which is enormous compared to the initial duration of nanoseconds for internal events. The latency of event logging is located at the source of input data for the application. It first slows down the rate of external data for the application. It also makes the operating system very slow by transforming very frequent internal non-deterministic events in serialization points.

Figure 2:
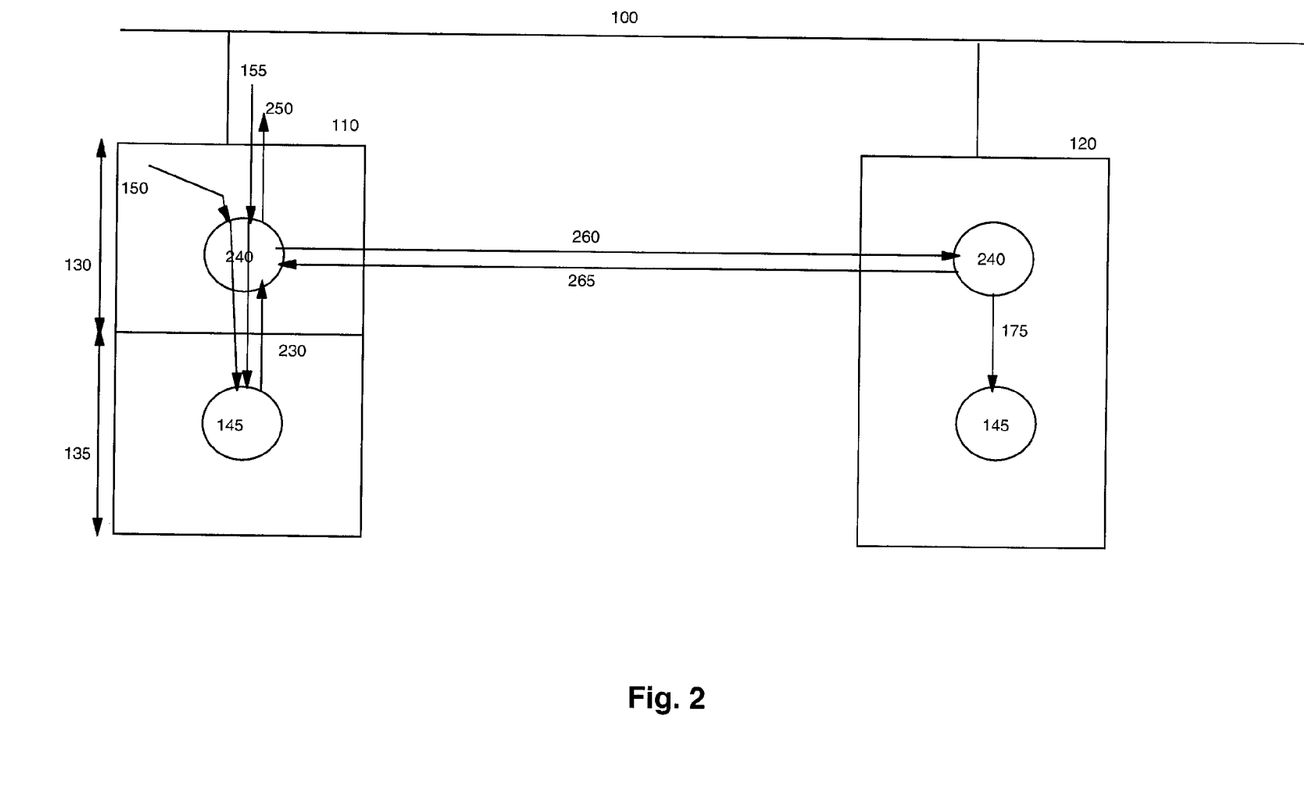
FIG. 2 illustrates a fault tolerant model implementing a solution for event log transfer being triggered by each external output event in accordance with an illustrative embodiment.

FIG. 2 illustrates a fault tolerant model implementing a solution for event log transfer in accordance with an illustrative embodiment. In the fault tolerant system of FIG. 2, the replication program of FIG. 1 has been modified 240 on the primary 110 and the standby 120 machines to implement the invention according to the illustrative embodiment. When applying deterministic replay to fault tolerance of transactional systems connected to external clients (assuming that those remote communication peers cannot be rolled back), an important point to notice is that a diverging behavior of the replica can be tolerated as long as no message is sent to the external world.

In a fault tolerant system based on concurrent processing, it means that the state of the replica must be identical to the original at the moment an external message is sent, by means of deterministic replay. If a failure occurs, all the non-deterministic events posterior to the last external message transmit can be ignored, and the replica can still be consistent with the external world. Consequently, the output of an external message constitutes a non-return point. It is mandatory to ensure that the standby can reach that state, by having the standby acknowledging the reception of the log of non-deterministic event up to that point, prior to sending the external message. Let us generalize this concept with "Non Abortable Events" (NAE), which are events that change irremediably the state of the external world, that we cannot roll back (we could only roll back the server). We can also define an "Abortable Sequence of Events" (ASE) as the list of all non-deterministic events that can be safely disregarded at standby recovery. They are all the events following the last NAE. A NAE, being by nature an output message, is not part of the event log, the output content being already determined by the replay system. It is rather a signal indicating that the event log must be committed to the standby before proceeding, to ensure recoverability. A consistent recovery of a transactional application interacting with the external world depends on the fact that critical log data has been committed at the time of Non Abortable Events, rather than at the non-deterministic event occurrence itself.

The two inputs received 150, 155 by the application 145 executing in the user space of the primary machine 110 are not captured by the replication program 240 and reach the application. On the contrary, the record part of the replication program 240 operating on the primary machine 110 captures the output 230 sent from the application which is a NAE. Then, the record part of the replication program 240 creates a log of the captured event, which is not detailed here but may be performed by any efficient way to record an event for its replaying in the replay phase of the replication. The replication program sends 260 a signal to the replay part of the replication program 240 operating in the kernel space of the standby machine 120. Then, the replay part of the replication program 240 in the standby machine 120 acknowledges 265 the good reception of the event log transmission. Upon reception of the acknowledgment 265, the record part of the replication program 240 in the primary machine 110 can forward 250 the output in the name of the application to the external world, the network 100 in this case. In parallel, as this illustrates a fault tolerant system, the replay part of the replication program 240 operating in the standby machine 120 forwards 175 the NAE event to the application 145 operating in the standby machine 120 in order to maintain it updated in case of failure. The output 230 issued by the application 145 is actually sent after a latency comprising the delay for capturing, logging, forwarding the event and for receiving the acknowledgment of good reception by the standby machine. With this new method, the log transfer serialization point is moved from any NDE (internal or external) input to output of NAE only.

With this solution, in some circumstances, the result of non-deterministic events can be forwarded to the application before sending them to the standby machine, as some entire sequences of events can be disregarded without impacting the consistency of the recovered application. A consequence is that sequences of non-deterministic events can be sent in "batch", rather than one by one, thus reducing the impact of the transfer latency. The event log transfer is triggered by each external output event. This solution removes internal serialization points due to event log transfer, by applying a strategy similar to caching, which speeds up the input operations and defers the physical write operations. The log transfer can run in parallel with the normal execution of the application, instead of being serialized, reducing even more the impact of log transfer latency.

Figure 3:
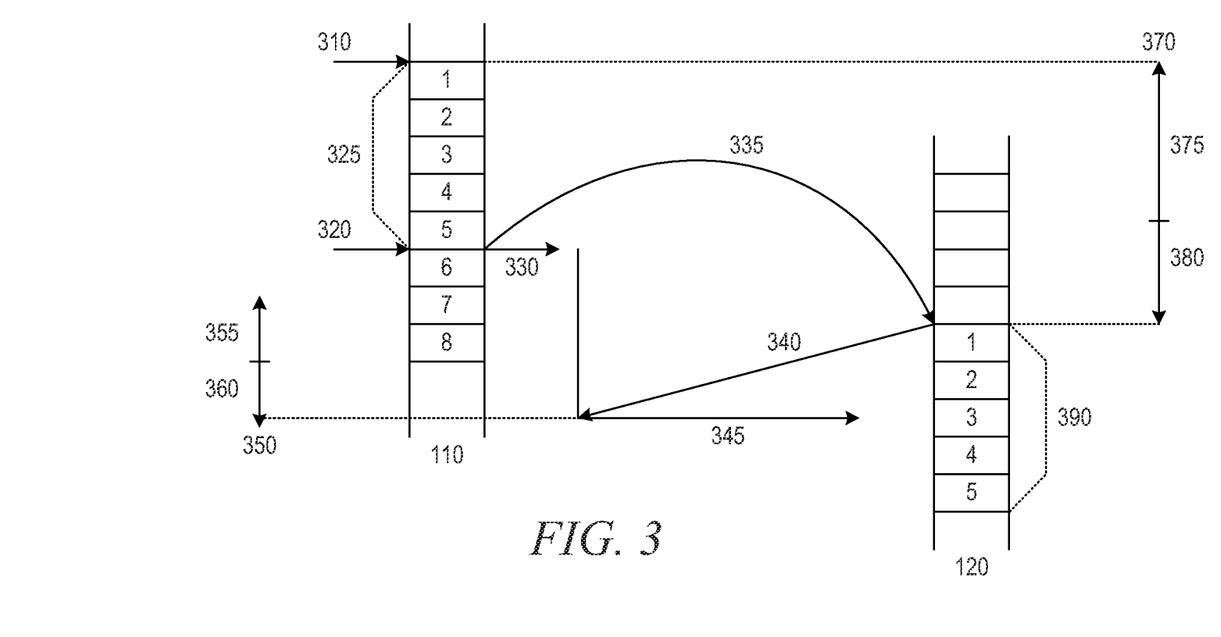
FIG. 3 illustrates data flows between primary and standby machine of the optional process using a write cache to defer the external output commit in accordance with an illustrative embodiment.

FIG. 3 illustrates data flows between a primary machine and a standby machine of the optional process using a write cache to defer external output commit in accordance with an illustrative embodiment. This option of the solution brings an additional level of optimization by introducing parallelism in transfer of the event log with the execution of the application. The occurrence of a NAE is broken down in two steps. The first step is the notification of a NAE, triggering the action of event log flush to the standby until the state reached at NAE notification. The second step is the NAE physical commit, which is buffered and deferred until the acknowledgment from the standby is received. The processing on NAE is the following:

The replication program in the operational machine 110 intercepts a NAE about to start (but not yet committed), i.e. the NAE notification 320.

Instead of being committed, the NAE is stored 330 in a temporary buffer, the NAE cache, and acknowledged to the module that posted the NAE, so that the application or operating system is not blocked.

all the log events comprising the NAEs of the cache until the last NAE plus the logged ASE in the FIFO on the operational machine is transmitted 335 to the standby machine 120.

On the reception of the acknowledgment 340 from the standby machine 120, the NAE is physically committed 345, and removed from the cache.

The ASE log of events 390 is replayed on the standby machine 120 after log transfer 335.

Committing the log at external data output is sufficient to ensure consistency of recovery, allowing the transmission of event log in bursts of ASEs 325 (events between the first event 310 and the NAE notification 320). Deferring the transmission of NAEs until reception of event log transmit acknowledgment allows to make transfer parallel for event log and the further execution of operational application. The NAE delay 350 comprises the Log latency 355 and the Acknowledgment latency 360. The Replay delay 370 comprises the ASE latency 375 and the Log latency 380. While this total latency is incurred only once per a set of several events contained in an ASE, an equivalent latency is incurred per each and every nondeterministic event, in the methods suggested in the prior art. By amortizing the overhead over a number of events, the proposed system achieves high performance.

Figure 4:
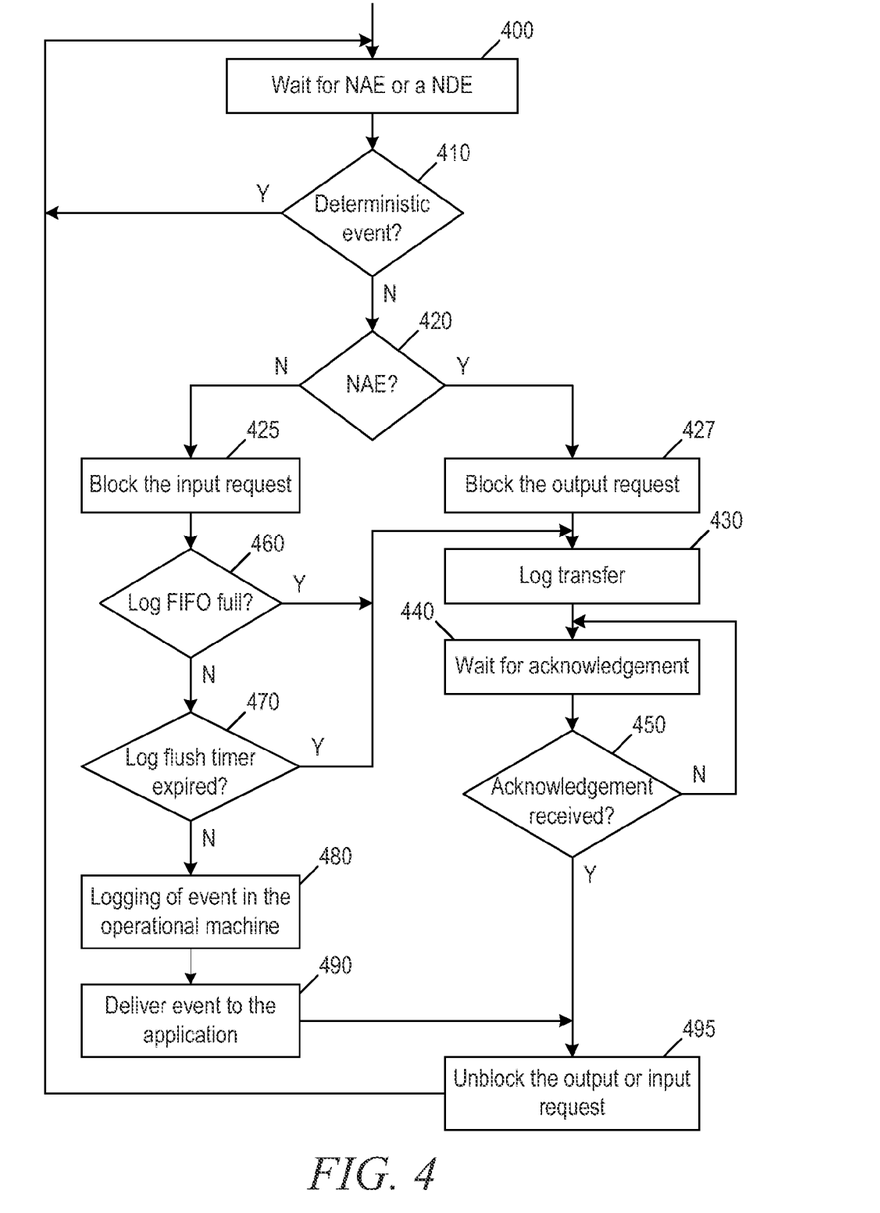
FIG. 4 is a general flowchart of log transfer in accordance with an illustrative embodiment.

FIG. 4 is a general flowchart of log transfer in accordance with an illustrative embodiment. This log transfer is implemented as a program in the operational machine as a part of the replication process of a set of programs (for instance from an application or it can be modules from an operating system) executing in an operational machine. This replication process consists in logging information on the execution of the application programs and transferring this information to the standby machine for replay of the application in that standby machine. The illustrative embodiment is described in a fault tolerant system maintaining a concurrent processing in the operational and standby machines. The information logged and transferred consists of an 'event' occurring between executing programs. These events may be internal or external to the operational machine, in input or output of the executing program. There is no processing required for deterministic events: deterministic event information has no need to be logged and transferred to the standby machine because it will be replayed in the standby machine by simple execution of the application.

A non deterministic event could potentially lead to more than one resultant application state, then, this event needs to be logged and transferred to the standby machine for replay with this information. The first step consists of waiting for a non-abortable event (NAE) notification or a nondeterministic event (NDE) (block 400) during execution of the application. A test for finding a non deterministic event is executed (block 410); such a test is implemented by selecting some types of events such as a system call for querying time which is a nondeterministic event. Then a test is executed to check if a so called NAE notification has occurred (block 420). An occurrence of a NAE such as a request by an executing module of sending an output message from the operational machine implies that there will be an irreversible change of the state of the external world. In this case, there is a need to replicate this situation and the events already logged up to the NAE notification need to be immediately sent to the standby machine.

If there is no notification of a NAE (answer No to test 420), and that a non deterministic event occurs, the non deterministic event can be safely disregarded at standby recovery, because there is no irreversible change of the state of the external world pending. This event needs to be logged in the operational machine. This non deterministic event could correspond to one executing program sending a request for an input message to the application. The input message is blocked (block 425). The event (starting an ASE if occurring just after a NAE has been notified) is logged preferably in a FIFO (block 480) if the Log FIFO is not full (answer No to test 460) and, optionally, if a timeout, preferably set as Log flush timer, has not expired (answer No to test 470), the event is delivered to the application (block 490) and the requesting module is unblocked (block 495) in the operational machine.

If the FIFO is full (answer Yes to test 460) the logging is not possible and one does not want to lose the event information. The use of a timeout is optional: if a NAE doesn't occur for a long time, it could be desirable to force the log flush (block 430) to ensure that the switchover time is small. A timer called log flush timer keeps track of the time interval between subsequent NAEs. The timer is reset each time a new NAE occurs: this is not mentioned in the general algorithm to avoid complicating the figures. It is noted that any way of counting a timeout between two NAEs may be implemented with the same benefit of the illustrative embodiment. In both cases (answer Yes to test 460 or answer Yes to test 470) the event log information needs to be transferred to the standby machine.

If a NAE notification occurs (answer Yes to test 420), this means that a request for sending an output message external to the application is performed by an executing module. This request is blocked (block 427). The occurrence of a NAE means that a portion of the application state is to be published to the external world: in this case, the logged event records in the FIFO, up to the NAE notification, need to be transferred to the standby machine.

In the case where a NAE notification occurs (answer yes to test 420) or when the non-deterministic event which not a NAE cannot be logged in the operational machine (answer Yes to test 460 or answer Yes to test 470), the content of the log is transferred (block 430) to the standby machine. The replication process waits in the operational machine until an acknowledgment of the transfer is received (block 440, answer No to test 450). When the acknowledgment is received (answer Yes to test 450), the request for output (NAE notification) or input (non deterministic event without any NAE notification), is unblocked in the operational machine (block 495) and the execution goes on. It is noted that the log transfer (block 430) is for an entire ASE sequence between two NAEs if either the log is full or if the log flush timer expires.

Figure 5:
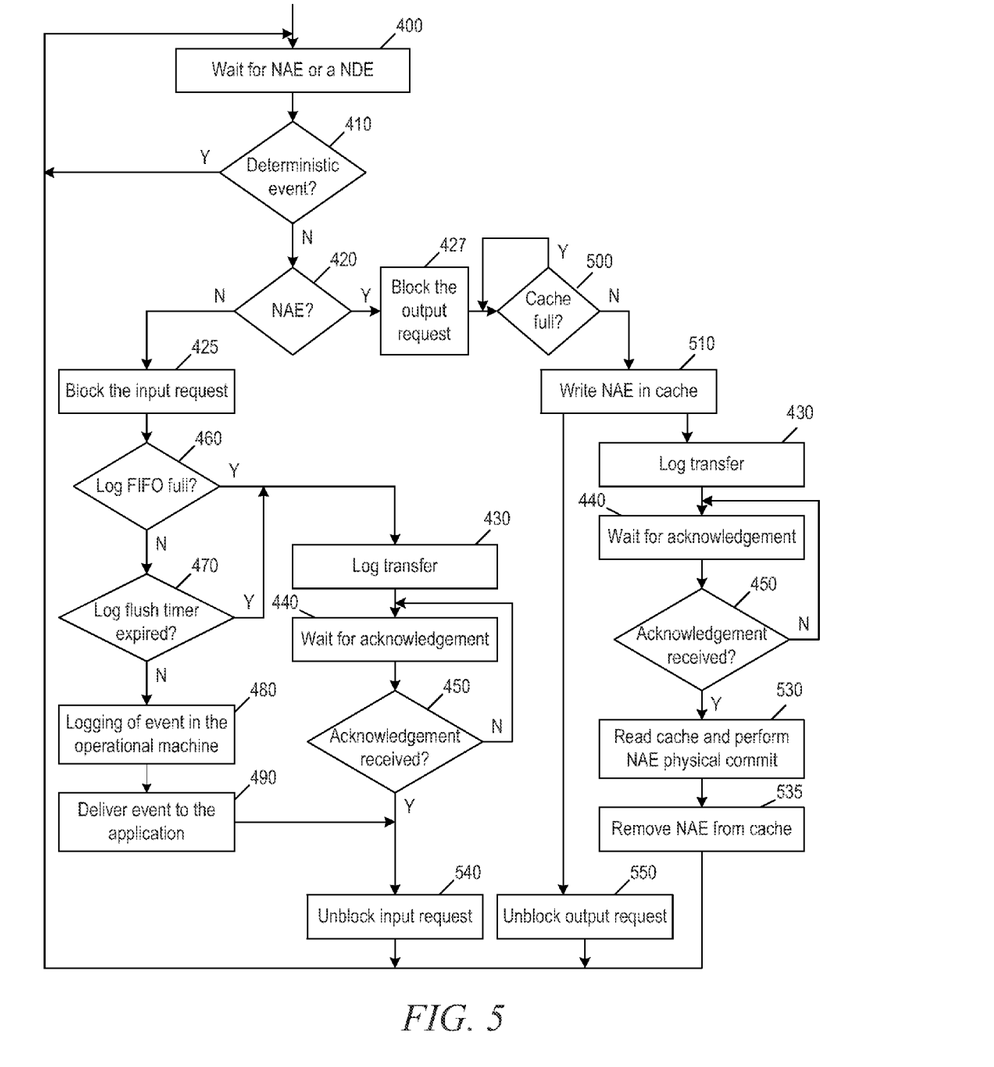
FIG. 5 is a general flowchart of log transfer wherein an optional write cache memory containing one non-abortable event is used in accordance with an illustrative embodiment.

FIG. 5 is a general flowchart of log transfer according to an illustrative embodiment wherein an optional write cache memory containing one NAE is used. The method implemented as a program in the operational machine, as a part of the replication process, uses a write cache in the operational machine for storing in a cache a NAE notification while acknowledging the module which had posted the NAE and thus avoiding blocking the execution on the operational machine. Then, when the cache is full with one NAE and when a new NAE arrives, the event log transfer is performed up to the NAE, the unblocking of the process having requested the output being blocked until reception of transmit acknowledgment. In parallel, the NAE physical commit is performed and the cache is freed.

FIG. 5 is a flowchart of operation in accordance with the illustrative embodiment to which use of an optional write cache is added. This operation is implemented as a program in the operational machine as part as the replication process, transferring information on the execution of an application to the standby machine, for replay of the application in the standby machine. The write cache option may be selected during a customization of the program. In this case, the operational system contains a write cache memory which is used to cache the NAE notification until the cache is full.

In the case where the underlying operating system already provides a write cache (buffer cache in the case of file system, for example), an additional write cache is not used. In that case, the flush of the cache provided by operating system would be the NAE. Compared to the method without operational write cache (blocks 400 to 495) this method executed in the operational machine comprises new operations (blocks 500, 510, 530, 535, 540, 550) in relation with the use of write cache memory. If a NAE notification or a NDE occurs (block 400) and if it is not a NAE (answer No to test 420), the process is similar than with the preferred embodiment (blocks 420, 425, 460, 470, 430, 440, 450, 470, 480, 490) even with the step of unblocking the input request (block 540 replacing block 495 of FIG. 4) the request being always an input request in FIG. 5.

If a NAE notification occurs (answer Yes to test 420), and the cache memory is not full (answer No to test 500), the event is logged in the write cache (block 510) and acknowledged to the module that posted the NAE requesting the output message to be sent, so that the execution is unblocked (block 550). In parallel to the execution of unblocking of output request (block 550), the log of events in the FIFO until the NAE notification, and containing the ASE, is transferred (block 430) to the standby machine. The replication process waits in the operational machine until an acknowledgment of the transfer is received (block 440, answer No to test 450). When the acknowledgment is received (answer Yes to test 450), the NAE is read from the cache and physically committed (block 530) to the standby machine. Then the NAE is removed from the cache memory (block 535). Thereafter, operation returns to block 400 to wait for a NAE or NDE.

While the NAE has not been removed from the cache because the commit has not yet completed, if another NAE notification occurs, the cache memory is tested as full (answer Yes to test 500). A loop allows waiting for the cache to be freed and the test to become negative (answer No to test 500).

Figure 6:
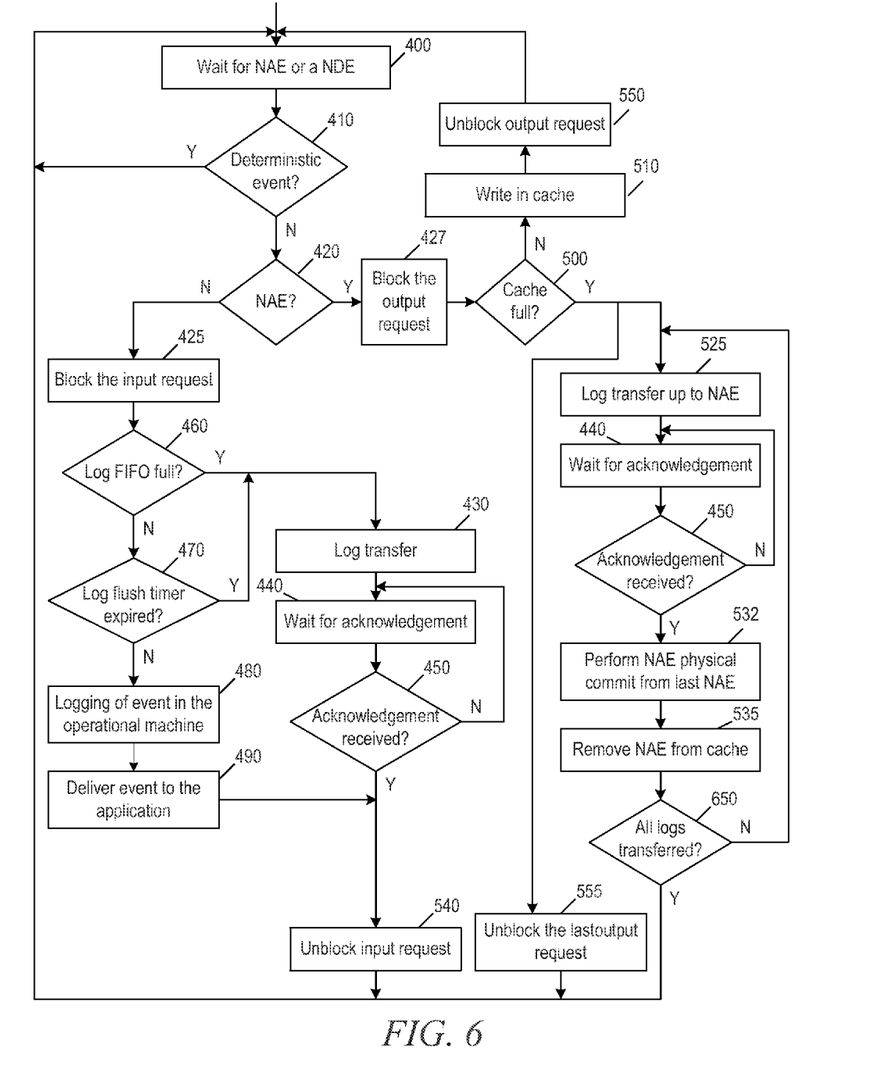
FIG. 6 is a general flowchart of log transfer wherein an optional write cache memory containing more than one non-abortable event is used in accordance with an illustrative embodiment.

FIG. 6 is a flowchart of operation of the illustrative embodiment to which use of an optional write cache adapted to contain more than one NAE is added. This operation is implemented as a program in the operational machine as part as the replication process transferring information on the execution of an application to the standby machine for replay of the application in the standby machine. The multiNAE write cache option may be selected during a customization of the program. In this case, the operational system contains a write cache memory large enough to contain more than one NAE which will be re-read, the NAE being stored until the cache is full. In the case where the underlying operating system already provides a write cache (buffer cache in the case of file system, for example) having the required capacity, an additional write cache is not used. In that case, the flush of the cache provided by operating system would be the NAE.

Compared to the method with an operational write cache for storing one NAE only, this method executed in the operational machine comprises new steps (blocks 525, 555, 532) in relation with the use of a multiNAE sized write cache memory. In FIG. 6, the NAE process differs in that, if the event is a NAE (answer Yes to test 420) and the cache memory is not full (answer No to test 500), the event is added in the write cache (block 510) and acknowledged to the module that posted the NAE, so that the execution is unblocked (block 550). If the cache is full (answer yes to test 500) after a NAE notification has occurred, the log of events, the ASEs up to the different NAEs in the cache and logged in the FIFO are transferred (block 525) to the standby machine. The replication process waits in the operational machine until an acknowledgment of the transfer is received (block 440, answer No to test 450). When the acknowledgment is received (answer Yes to test 450), the NAE corresponding the acknowledged log transfer is physically committed (block 532) to the standby machine and the NAE is removed from cache (block 535). If all the ASEs logged in the FIFO are not all transferred (answer No to test 650), the log transfer is repeated (blocks 525, 440, 450, 532, 535, 450) until all the log are transferred until the last NAE.

The three embodiments described in FIGS. 4, 5, and 6 can be used in a computer system performing replication for immediate transfer to a standby machine in case of a fault tolerant system comprising an operational machine maintaining a standby machine in case of failure. The same embodiments can be used if the transfer is done to storage for recording application replication information to be replayed later on one other machine for archiving purposes. Or, the same embodiments can be used by a developer for testing the application and which will analyze all the logged and transferred events. The replication method can apply to programs executing for an application, the replication allowing in this case application container isolation. However, as already mentioned, this same method may apply for replicating modules of an operating system executing on the operational machine. This method applies to replication used for virtualization architectures based on hypervisors.

The solution of the invention brings further advantages:

with the present solution, there is no more waiting time upon reception of an input to the application, even if processing the output events is increased but in a lower measure. An application typically receives between ten and one hundred times more internal inputs than external inputs, but an application generates the same occurrence of external outputs as external inputs events. Therefore, by slightly impacting processing time of external events, one typically slows down one hundred times less than with the standard solution. Without changing the transfer protocol properties, and simply if log is transferred upon an occurrence of an external output event rather than an occurrence of an internal or external input event, then, overhead is greatly reduced.

as with the standard solution, implementing the solution of the present invention does not imply any change in the application.

the transfer protocol remains unchanged with the solution of the present invention. The FT system implementing the solution of the present invention can use a standard transfer protocol such as TCP which warranties data integrity.

finally, a strong advantage of the solution of the present invention is the possibility to be upgradeable with an optional 'write cache' (deferred write strategy) which allows unblocking output requests from the application. Activating this option requires increasing storage capacity comparable to the size of the log with the standard solution.

in the case of multicpu primary systems, the solution of the present invention allows full parallelism of transfer, one processor could be dedicated to log transfer without slowing down the application. On the contrary, with the standard solution because of the serialization of transfer and event delivery, a dedicated CPU is useless for improving performance.

Generalization of the use of the invention:

the solution of the present invention, improving the performance of transfer of event log during replication, can be applied to any environment where replication is needed. Fault tolerant systems are taken as example as being very sensitive to performance. The invention is more useful for fault tolerant systems applying an active-active model, that is, having both the primary and standby machine in active mode. But the transfer of event log of the invention can be performed in fault tolerant systems implementing an active-passive model that is, having the primary machine in active mode and the standby machine in passive mode. Event log data may be sent by the primary machine towards a remote machine storing event log data for later replay in one other machine; this remote machine acknowledging to the primary machine reception of event log data. This configuration can be used for archiving purpose when, for instance, this is required by law.

the invention can be implemented as well to replicate application for debugging purpose even if this use is less sensitive to performance.

finally, the example of replication of application taken in the document is sufficiently general to encompass any type of application. Replication is a solution for virtualization and there are many models of virtualization. In some models, the user applications are virtualized and thus can be replicated. In other models, the hypervisor on which operates the user applications are themselves virtualized and thus may be replicated. Finally, a virtual machine can be also virtualized and the entire virtual machine may in this case be replicated. In all the cases the improvement of the solution of the invention can be applied for the transfer of event log.

The invention claimed is:

1. A method executing on a computer system for replicating a program executing on the computer system at a destination accessible from the computer system, the method comprising:

receiving an executing program request associated with an executing program;

responsive to the executing program request being a non-deterministic event, blocking the executing program request;

responsive to determining the executing program request is an input for the executing program to be replicated, logging the non-deterministic event in a first storage, delivering the non-deterministic event to the executing program, and unblocking the executing program request;

responsive to determining the executing program request is a non-abortable output request from the executing program for sending an output message, transferring contents of the first storage to the destination, and responsive to an acknowledgment being received from the destination, unblocking the executing program request; and responsive to expiration of a timer that is reset at each occurrence of a subsequent non-abortable output request, transferring contents of the first storage to the destination, and responsive to an acknowledgment being received from the destination, unblocking the executing program request.

2. The method of claim 1, further comprising;
responsive to the non-deterministic event being the input for the executing program and the first storage being full, transferring contents of the first storage to the destination, and responsive to an acknowledgment being received from the destination, unblocking the executing program request.

3. The method of claim 1, further comprising:
responsive to the nondeterministic event being the non-abortable output request, writing the output message to a second storage and performing the following:
unblocking the executing program request and, in parallel,
transferring contents of the first storage to the destination and responsive to an acknowledgment being received from the destination, performing the executing program request, and removing the output message from the second storage.

4. The method of claim 3, further comprising:
responsive to the second storage being full, re-testing whether the second storage is full until a removing step is executed and the second storage is no longer full.

5. The method of claim 3, further comprising:
responsive to the second storage not being full, writing the output message to the second storage and unblocking the executing program request; and
responsive to the second storage being full, for all output messages in the second storage, transferring contents of the first storage up to the non-abortable output request to the destination, and responsive to an acknowledgment being received, performing the request and removing the output message from the second storage.

6. The method of claim 3, wherein the second storage comprises a cache memory.

7. The method of claim 1, wherein the first storage comprises a first-in-first-out buffer.

8. A computer program product comprising a computer memory having a computer readable program stored thereon, wherein the computer readable program, when executed on a computing device, causes the computing device to:
receive an executing program request associated with an executing program;
responsive to the executing program request being a non-deterministic event, block the executing program request;
responsive to determining the executing program request being an input for the executing program to be replicated, log the non-deterministic event in a first storage, deliver the non-deterministic event to the executing program, and unblock the executing program request;
responsive to determining the executing program request is a non-abortable output request from the executing program for sending an output message, transfer contents of the first storage to the destination and responsive to an acknowledgment being received from the destination, unblock the executing program request; and
responsive to expiration of a timer that is reset at each occurrence of a subsequent non-abortable output request, transfer contents of the first storage to the destination, and responsive to an acknowledgment being received from the destination, unblock the executing program request.

9. The computer program product of claim 8, wherein the computer readable program further causes the computing device to:
responsive to the non-deterministic event being the input for the executing program and the first storage being full, transfer contents of the first storage to the destination and responsive to an acknowledgment being received from the destination, unblock the executing program request.

10. The computer program product of claim 8, wherein the computer readable program further causes the computing device to;
responsive to the non-deterministic event being the non-abortable output request, write the output message to a second storage and performing the following:
unblock the executing program request and, in parallel,
transfer contents of the first storage to the destination and responsive to an acknowledgment being received from the destination, perform the executing program request, and remove the output message from the second storage.

11. The computer program product of claim 10, wherein the computer readable program further causes the computing device to:
responsive to the second storage being full, re-test whether the second storage is full until a removing step is executed and the second storage is no longer full.

12. The computer program product of claim 10, wherein the computer readable program further causes the computing device to:
responsive to the second storage not being full, write the output message to the second storage and unblock the executing program request; and
responsive to the second storage being full, for all output messages in the second storage, transfer contents of the first storage up to the non-abortable output request to the destination, and responsive to an acknowledgment being received from the destination, perform the request and remove the output message from the second storage.

13. An apparatus, comprising:
a processor; and
a memory coupled to the processor, wherein the memory comprises instructions which, when executed by the processor, cause the processor to:
receive an executing program request associated with an executing program;
responsive to the executing program request being a non-deterministic event, block the executing program request;
responsive to determining the executing program request is an input for the executing program to be replicated, log the non-deterministic event in a first storage, deliver the non-deterministic event to the executing program, and unblock the executing program request;
responsive to determining the executing program request is a non-abortable output request from the executing program for sending an output message, transfer contents of the first storage to the destination and responsive to an acknowledgment being received from the destination, unblock the executing program request; and
responsive to expiration of a timer reset at each occurrence of a subsequent non-abortable output request, transfer contents of the first storage to the destination, and responsive to an acknowledgment being received from the destination, unblock the executing program request.

14. The apparatus of claim 13, wherein the instructions further causes the processor to:

responsive to the non-deterministic event being the input for the executing program and the first storage being full, transfer contents of the first storage to the destination and responsive to an acknowledgment being received from the destination, unblock the executing program request.

15. The apparatus of claim 13, wherein the instructions further causes the processor to:
responsive to the nondeterministic event being the non-abortable output request, write the output message to a second storage and performing the following:
unblock the executing program request and, in parallel, transfer contents of the first storage to the destination and responsive to an acknowledgment being received from the destination, perform the executing program request, and remove the output message from the second storage.

16. The apparatus of claim 15, wherein the instructions further causes the processor to:
responsive to the second storage being full, re-test whether the second storage is full until a removing step is executed and the second storage is no longer full.

17. The apparatus of claim 15, wherein the instructions further causes the processor to:
responsive to the second storage not being full, write the output message to the second storage and unblock the executing program request; and
responsive to the second storage being full, for all output messages in the second storage, transfer contents of the first storage up to the non-abortable output request to the destination, and responsive to an acknowledgment being received from the destination, perform the request and remove the output message from the second storage.

* * * * *